M. P. HOLMES.
WHEEL.
APPLICATION FILED DEC. 15, 1919.

1,387,398.

Patented Aug. 9, 1921.

Inventor.
Morris P. Holmes.
by
Atty.

UNITED STATES PATENT OFFICE.

MORRIS P. HOLMES, OF CLAREMONT, NEW HAMPSHIRE, ASSIGNOR TO SULLIVAN MACHINERY COMPANY, A CORPORATION OF MASSACHUSETTS.

WHEEL.

1,387,398.     Specification of Letters Patent.     Patented Aug. 9, 1921.

Application filed December 15, 1919. Serial No. 344,943.

*To all whom it may concern:*

Be it known that I, MORRIS P. HOLMES, a citizen of the United States, residing at Claremont, in the county of Sullivan and State of New Hampshire, have invented certain new and useful Improvements in Wheels, of which the following is a full, clear, and exact specification.

My invention relates to wheels.

It has for its object to provide an improved wheel, and more especially an improved truck wheel, which is of a simple and rugged construction adapted to be cheaply manufactured and to withstand rough usage in service. A more specific object of my invention is to provide improved, simplified and rugged means for attaching a wheel to its axle and removably securing the wheel bearings, whereby the wear is placed upon wear absorbing members adapted to be readily substituted when desired, and whereby the whole mechanism is made readily accessible. These and other advantages of my improved construction will, however, hereinafter more fully appear.

In the accompanying drawings I have shown, for purposes of illustration, one embodiment which my invention may assume in practice, illustrating the same as applied to a truck wheel.

In these drawings.

Figure 1:
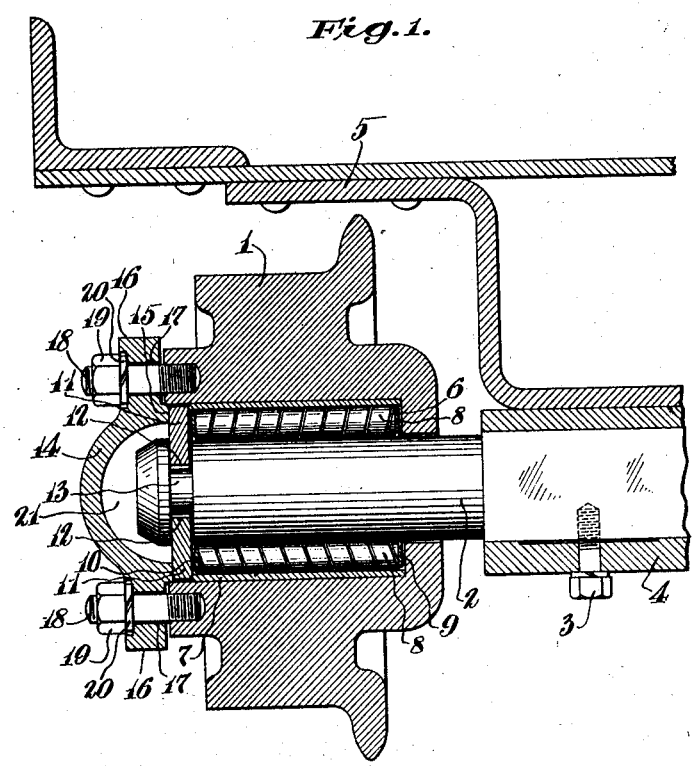
Figure 1 is a vertical sectional view of this form of my invention in position on a truck.
Figure 2:
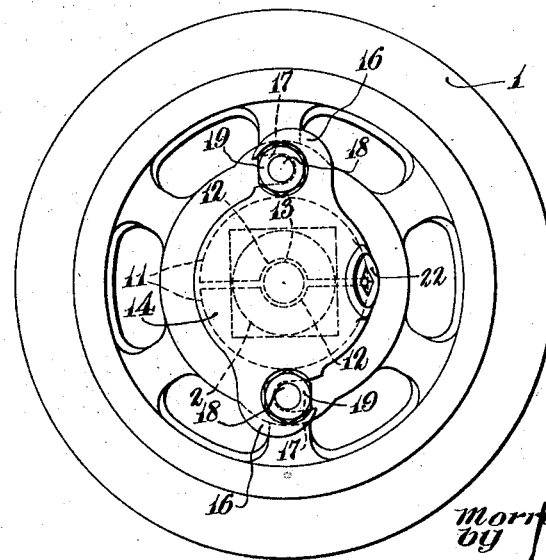
Fig. 2 is a side elevation of the wheel.

In this illustrative construction, it will be observed that the wheel 1 is carried upon the outer end of a suitable axle 2, herein a removable stub axle having a body of rectangular cross section rigidly connected as by a set screw 3 with the body 4 of the truck frame 5, the wheel being operatively connected to and mounted upon the axle 2 in an improved manner and through means hereinafter described.

The wheel 1 may be of any suitable or standard construction and is provided with a suitable axially disposed bore or chamber 6 of greater diameter than the diameter of the shaft 2. In this chamber and disposed between the shaft 2 and a bearing sleeve 7 fitting the inner wall of the chamber, are suitable friction bearings, herein in the form of roller bearings 8. As shown, the inner ends of these bearings are suitably spaced as by a washer 9 from the end wall of the chamber 6 and a corresponding washer 10 is also preferably similarly located at their outer ends, the construction preferably being such that the bearings and the washers at their opposite ends are all disposed within the ends of the sleeve 7.

Operatively connected to the wheel 1 and the axle 2 is improved means for connecting or interlocking these elements, retaining the bearings 8 in position, and taking the wear during service. These means preferably include, as shown, a plurality of members 11 of semi-disk form having semi-circular cutaway portions 12 in their adjacent surfaces, adapted to be received in a suitably formed reduced portion, herein, for example, an annular groove 13, formed on the outer end of the shaft 2. As shown, these members 11 unite to form a disk receivable in the groove 13 when the wheel 1 is pushed inward against the frame and adapted to be received in the outer end of the bore or chamber 6 when the wheel is again pulled outward. Coöperating with these members 11 and acting to hold the same in position, is also a suitable member, herein a cap 14, adapted to be attached to the wheel and preferably having an annular flange 15 thereon adapted to abut against the members 11 adjacent their peripheries and likewise to be received within the outer end of the bore or chamber 6 in such a manner as definitely to position the members 11 and bearings. As shown, this cap 14 is also provided with oppositely extending hooks 16 on its opposite sides, which, as shown, are preferably arcuately slotted as at 17 in such a manner as to enable said hooks, when the member 14 is turned in the bore 6, to engage horizontally disposed studs 18 which are carried on the wheel 1 on opposite sides of the bore or chamber 6, and themselves carry nuts 19 and suitable lock washers 20 adapted, when the hooks 16 are in this engaged position, to clamp the parts securely together. Here attention is also directed to the fact that the cap 4 is so shaped as to form an oil chamber 21 communicating with the bearings through the flange 15, and that the cap is also provided with an oil inlet plug 22 so that this chamber may be conveniently filled when desired.

In the use of my improved construction, when it is desired to remove the members 11 or the bearings for any reason, it is only necessary to loosen the nuts 19 without removing the same, rotate the cap 14 to free its hooks from the bolts, pull out the cap 14 and shove in the wheel 1 on its axle, whereupon the members 11 and the bearings become readily accessible. In re-assembling the parts when in this position, it is obviously only necessary to replace the members 11, pull out the wheel, insert and turn the cap, and then tighten the nuts 19, whereupon the parts are securely held in their desired assembled relation. Obviously, the parts may also be lubricated whenever desired by filling the chamber 21 through the inlet 22, the construction being such that the lubricant in the chamber may have free access to all the working parts.

As a result of my improved construction, it will be noted that practically all of the wear is taken upon the members 11 and that these members are readily removable when desired, the construction being such that new members may be substituted with great facility and without necessarily disassembling the entire mechanism, it only being necessary to loosen the screws, remove the cap by a simple operation, and push in the wheel, a process capable of being performed in a few moments. Attention is also directed to the fact that through my improved construction, it is possible to produce a wheel of a rugged and readily accessible type at relatively small expense, the construction being simple and of a type which may be manufactured with a minimum of machining or special parts.

While I have in this application specifically described one form which my invention may assume in practice, it will be understood that this form of the same is shown for purposes of illustration and that the invention may be modified and embodied in other forms without departing from its spirit or the scope of the appended claims.

What I claim as new and desire to secure by Letters Patent is:

1. In combination, an axle, a wheel thereon, sectional interlocking means therefor, and means on said wheel for holding the same in position, said means being releasable by partial revolution relative to said wheel.

2. In combination, an axle, a wheel thereon, and sectional interlocking means therefor released by a longitudinal movement of said wheel.

3. In combination, an axle, a wheel thereon, bearings between said axle and wheel housed in said wheel, detachable wear absorbing bearing retaining members housed in said wheel and inter-engaged with said axle, and means on said wheel holding said members in position.

4. In combination, an axle, a wheel thereon, bearings between said axle and wheel housed in said wheel, detachable sectional wear absorbing bearing retaining members housed in said wheel and inter-engaged with said axle, and means on said wheel holding said members in position.

5. In combination, an axle, a wheel thereon movable longitudinally of the axis thereof, bearings in said wheel, and sectional wear absorbing bearing retaining members housed in said wheel and inter-engaged with said shaft and removable when said wheel is moved longitudinally of said shaft.

6. In combination, an axle, a wheel thereon movable longitudinally of the axis thereof, bearings in said wheel, and sectional wear absorbing bearing retaining members interengaged with said shaft and housed in said wheel when the latter is moved longitudinally of said shaft in a direction toward said members.

7. In combination, an axle having a reduced portion in its end, a wheel on said axle having a recess surrounding the latter, bearings in said recess, wear absorbing bearing retaining and locking members extending into said reduced portion and disposed in said recess, and a cap clamping said members in position in said recess.

8. In a truck wheel, a wheel body having a recess therein, a cap having a projecting portion extending into the mouth of said recess and rotatable and longitudinally movable relative thereto, said cap having oppositely disposed laterally extending ends, abutments on said wheel engaged by said ends, and means for clamping said ends to said abutments.

9. In a truck wheel, a wheel body having a recess therein, a cap having a projecting portion extending into the mouth of said recess and rotatable and longitudinally movable relative thereto, said cap having oppositely disposed laterally extending ends, and a lubricant supply chamber in its body portion communicating with said recess, abutments on said wheel engaged by said ends, and means for clamping said ends to said abutments.

10. In combination, an axle, a wheel thereon having a recess therein, bearings in the recess in said wheel and surrounding said axle, sectional retaining means interlocked against longitudinal movement relative to said axle and relative to which said wheel is slidable, a cap releasably carried by said wheel holding said retaining means in position, and means for holding said cap from which the latter may be withdrawn after a partial rotation relative to the wheel.

11. In combination, an axle having means forming a reduced portion adjacent its end, a wheel rotatable on said axle and having a recess surrounding the latter, bearings rotatably mounted in said recess, sectional bearing retaining means including members receivable in said reduced portion and coöperating to form a disk surrounding the axis of said shaft, and means for clamping said members in position.

12. In combination, an axle having means forming a reduced portion adjacent its end, a wheel rotatable on said axle and having a recess surrounding the latter, bearings in said recess, sectional bearing retaining means coöperating to form a disk surrounding the reduced portion of said shaft, and means on said wheel extending into said recess and holding said members in position.

13. In combination, a shaft, a wheel thereon having a recess therein, bearings in the recess in said wheel, sectional bearing retaining members received in said recess and inter-engaged with said shaft, and coöperating retaining means receivable in one end of said recess, said first mentioned bearing retaining means being removable upon removal of said coöperating means and a longitudinal movement of said wheel relative to said shaft.

14. In combination, a shaft, a wheel thereon having a recess therein, bearings in the recess in said wheel, a plurality of bearing retaining members receivable in said recess and inter-engaged with said shaft, said bearing retaining members coöperating to form a sectional disk of slightly less diameter than the diameter of said recess and being receivable in said recess upon longitudinal movement of said wheel relative to said shaft.

15. In combination, a shaft, a wheel thereon having a recess therein, bearings in the recess in said wheel, sectional bearing retaining means including a plurality of members removably inter-engaged with said shaft and receivable in the recess in said wheel upon a longitudinal movement of said wheel relative to said shaft, and a cap clamping said retaining means in position.

16. In combination, a shaft having a reduced portion on its end, an axially recessed wheel thereon, bearings in the recess in said wheel, a plurality of bearing retaining members coöperating to form a disk surrounding the reduced portion of said shaft, said bearing retaining members being receivable in the recess in said wheel upon longitudinal movement of said wheel relative to said shaft, a cap having a portion extending into one end of said recess and engaging said retaining members, and means on said cap and wheel for securing the former thereto including angularly movable hooks and coöperating clamping mechanism.

17. In combination, a shaft having a reduced portion on its end, an axially recessed wheel thereon, bearings in the recess in said wheel, a plurality of bearing retaining members coöperating to form a disk surrounding the reduced portion of said shaft, said bearing retaining members being receivable in the recess in said wheel upon longitudinal movement of said wheel relative to said shaft, a cap having a lubricant chamber therein and having a flange surrounding the same extending into one end of said recess and engaging said retaining members, and means on said cap and wheel for securing the former thereto including angularly movable hooks and coöperating clamping mechanism.

In testimony whereof I affix my signature.

MORRIS P. HOLMES.